US007376402B2

(12) United States Patent
Lecomte et al.

(10) Patent No.: US 7,376,402 B2

(45) Date of Patent: May 20, 2008

(54) MULTIBAND RDS RADIO RECEIVER

(75) Inventors: Jean-Pierre Lecomte, Rambouillet (FR); Frits De Jong, Nuenen (NL)

(73) Assignee: VDO Automotive AG, Munich (DE)

(*) Notice: Subject to any disclaimer, the term of this patent is extended or adjusted under 35 U.S.C. 154(b) by 328 days.

(21) Appl. No.: 10/458,376

(22) Filed: Jun. 11, 2003

(65) Prior Publication Data

US 2004/0038663 A1 Feb. 26, 2004

(30) Foreign Application Priority Data

Jun. 12, 2002 (EP) ................................. 02013402

(51) Int. Cl.
*H04B 1/18* (2006.01)

(52) U.S. Cl. ................. 455/186.1; 455/142; 455/168.1

(58) Field of Classification Search ............. 455/186.1, 455/186.2, 184.1, 185.1, 142, 160.1, 161.1, 455/167.1, 168.1, 179.1

See application file for complete search history.

(56) References Cited

U.S. PATENT DOCUMENTS

| | | | | |
|---|---|---|---|---|
| 4,527,281 | A * | 7/1985 | Imagawa et al. | 455/165.1 |
| 5,303,401 | A * | 4/1994 | Duckeck et al. | 455/186.1 |
| 5,471,662 | A * | 11/1995 | Shiota | 455/166.1 |
| 5,537,674 | A * | 7/1996 | Kishimoto et al. | 455/186.1 |
| 5,584,051 | A * | 12/1996 | Goken | 455/68 |
| 5,768,697 | A * | 6/1998 | Shirakawa | 455/181.1 |
| 6,021,320 | A | 2/2000 | Bickford et al. | |
| 6,163,683 | A * | 12/2000 | Dunn et al. | 455/151.1 |
| 6,829,475 | B1 * | 12/2004 | Lee et al. | 455/419 |
| 2003/0069032 | A1 * | 4/2003 | Jarvi et al. | 455/466 |

FOREIGN PATENT DOCUMENTS

| | | | |
|---|---|---|---|
| DE | 198 57 888 | A1 | 10/2000 |
| EP | 0 178 146 | A2 | 7/1985 |
| EP | 0 333 194 | A2 | 3/1989 |

* cited by examiner

*Primary Examiner*—Edward F. Urban
*Assistant Examiner*—Nhan T. Le
(74) *Attorney, Agent, or Firm*—Laurence A. Greenberg; Werner H. Stemer; Ralph E. Locher

(57) ABSTRACT

A radio receiver having an FM band tuner, an AM band tuner, a controller coupled to both said tuners, and a radio data (RD) decoder for providing radio data. The RD decoder is coupled for receiving radio data from at least one of the tuners which is tuned to a radio program. The RD decoder is coupled to the controller for switching the radio receiver from FM band to AM band or vice versa based on radio program frequency correspondence data included in the radio data. The radio receiver is advantageous since it allows for automated cross switching between different frequencies whereon a same radio program is broadcast. This is particularly advantageous if the radio receiver, such as placed in a car, leaves the broadcast coverage area. User intervention is thus obviated.

6 Claims, 1 Drawing Sheet

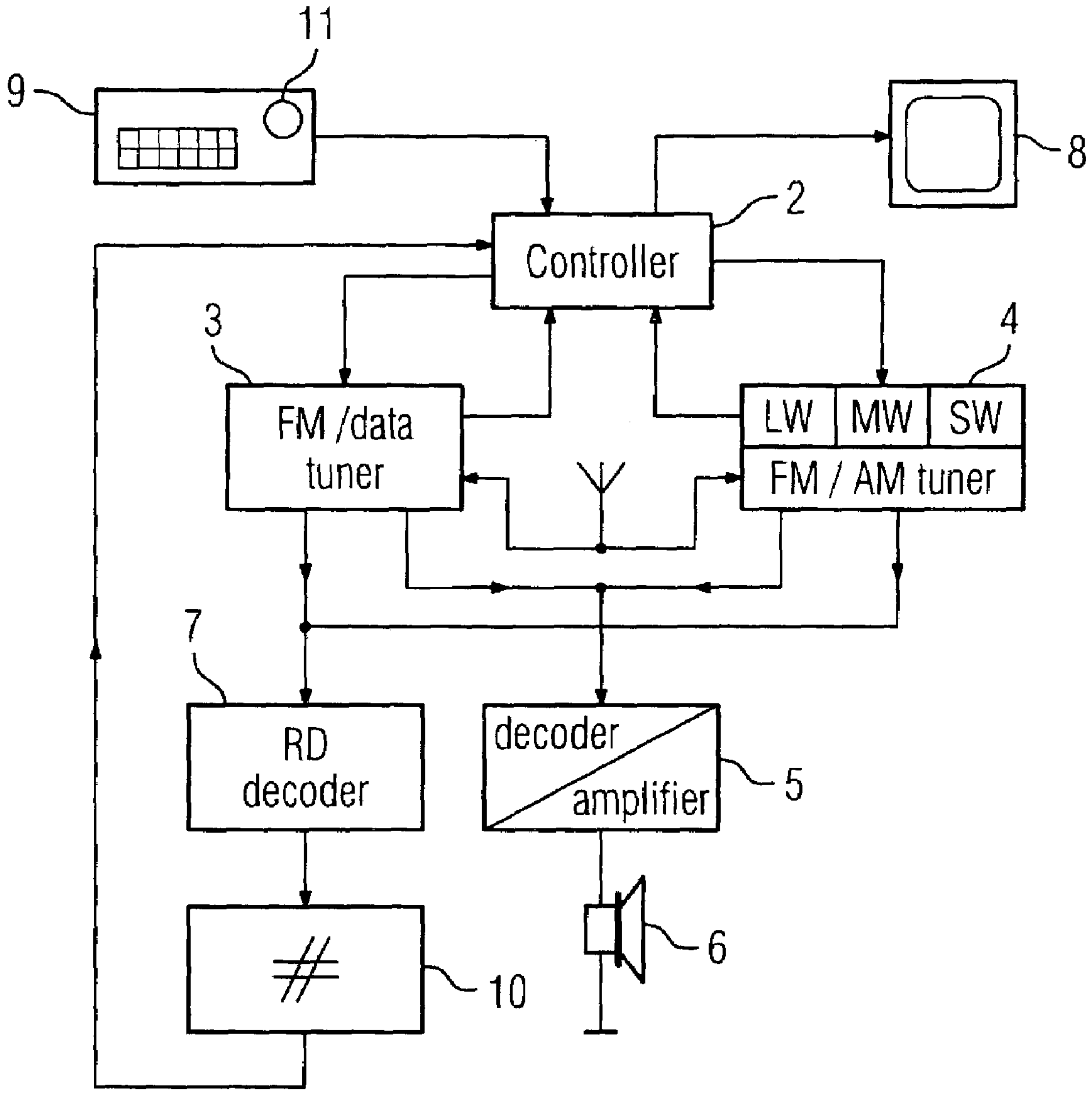
11
9
8
2
Controller
3
4
FM /data tuner
LW
MW
SW
FM / AM tuner
7
RD decoder
decoder
amplifier
5
6
10

MULTIBAND RDS RADIO RECEIVER

CLAIM FOR PRIORITY

This application claims priority to European Application No. 02013402.9 which was filed on Jun. 12, 2002, which is hereby incorporated by reference.

TECHNICAL FIELD OF THE INVENTION

The present invention relates to a radio receiver and to a portable or car radio receiver provided with a radio receiver and to signals suited for use in such a radio receiver.

BACKGROUND OF THE INVENTION

A radio receiver system is disclosed in U.S. Pat. No. 6,021,320. The conventional receiver may comprise an FM band and an AM band tuner, a controller/processor coupled to both said tuners, and a radio data (RD) decoder for providing radio data, which RD decoder is coupled for receiving radio data from at least one of the tuners, which is tuned to a radio program. In a so called "snapshot" function, both the AM and FM signal bands are searched to determine what program frequencies are receivable thereby, and all such receivable program frequencies are stored under appropriate program types. Examples of program types are: jazz, country, news, rock, nostalgia, sports, big band, 50's, 60's, 70's and the like. Through a user interface the user may select a preferred program type, where after the user may further select pre-set receiving frequencies, whereupon these types of programs are transmitted by different radio program broadcasts.

It is a disadvantage of the conventional radio receiver that user intervention for renewed tuning of the receiver is still required every time the received signal of a wanted particular radio program faints away. That is, in case the distance between the transmitter and the receiver becomes too large, and the receiver leaves the broadcast coverage area.

SUMMARY OF THE INVENTION

The present invention provides an easy operated radio receiver requiring less handling and under driving conditions potentially dangerous user intervention.

In one embodiment of the invention, there is a radio receiver, and in particular, a radio receiver comprising an FM band tuner and an AM band tuner, a controller coupled to both of the tuners, and a radio data (RD) decoder for providing radio data, which RD decoder is coupled for receiving radio data from at least one of the tuners, which is tuned to a radio program.

Another embodiment of the invention relates to a portable or car radio receiver provided with such a radio receiver, and to signals suited for use in such a radio receiver.

The radio receiver according to one aspect of the invention discloses the RD decoder coupled to the controller for switching the radio receiver from FM band to AM band or vice versa based on radio program frequency correspondence data included in the radio data.

One advantage of the radio receiver according to the invention is that it allows for automatic cross switching between different frequencies where a same radio program is broadcast. This is particularly advantageous if the radio receiver, for example placed in a car, leaves the broadcast coverage area. User intervention is thus obviated.

Even if radio programs in the AM band are not accompanied by radio data (RD) or radio data service (RDS), the radio program's name listened to in the AM band can still be provided to a user—such as by display on a visual display—because the program name can be derived from the radio data of the same radio program transmitted on an associated frequency in the FM band.

An embodiment of the radio receiver according to the invention provides that the FM band tuner is a LW band, and/or MW band tuner.

One advantage of this embodiment is that depending on the area covered by the transmitter where the program is broadcast, an automatic switching preferably at the boundary of the area between different frequency bands is possible. If no radio data is provided on LW, and/or MW band, use can be made of radio data provided on FM about the correspondence between frequencies on the different bands whereon a particular radio program broadcasts.

In another embodiment of the radio receiver according to the invention, the controller is arranged for switching from FM band to LW band, or MW band and vice versa. This makes a switching between FM and LW, FM and MW, and LW and MW bands, and vice versa, possible.

In still another embodiment of the radio receiver according to the invention, the radio receiver comprises an RD memory coupled to the RD decoder, which memory at least contains radio program frequency concordance data.

Another advantage of this embodiment of the radio receiver according to the invention is, that while stationed in an area where radio data is transmitted to the receiver, the RD memory can be filled with concordance information respecting associated frequencies in different frequency bands broadcasting the same radio program. In this way, the information already stored in the RD memory can advantageously be used later, such as in cases wherein the receiver is stationed in another area without radio data coverage.

In yet another embodiment of the radio receiver according to the invention, the FM and AM tuners are capable of providing an audio quality signal for input to and qualification by the controller. The controller is then capable of selecting the tuner providing the highest audio quality of a user selected radio program concerned.

In order to improve a trouble free operation, it is preferred to have a radio receiver according to the invention, wherein the radio receiver is provided with a cancellation switch coupled to the controller for cases, and the actual radio program frequency is used or disturbed by another program.

In one preferred embodiment, the radio receiver is included in a portable or car radio receiver.

BRIEF DESCRIPTION OF THE DRAWINGS

The invention will be described below, with reference being made to the drawing, in which:

FIG. 1 shows a schematic view of an embodiment of a radio receiver in accordance with the invention.

DETAILED DESCRIPTION OF THE PREFERRED EMBODIMENTS

FIG. 1 shows a schematic view of an embodiment of a radio receiver 1. The radio receiver 1 comprises a controller coupled to two tuners embodied by a FM band tuner 3 and an AM band tuner 4. The controller 2 is preferably embodied by a processor, such as a microprocessor. Each or both tuners 3 and 4 may be selected by the controller 2 to handle one or more received antennae signals. One of the received signals from a tuned on radio program is properly signal processed, decoded and amplified in a unit 5 and fed to one or more loudspeakers 6. If one or more of the tuners 3 and 4 is tuned to a radio program which provides accompanying radio data, such data may be decoded by a RD decoder 7 and be displayed on a visual display 8. The proper control, tuning and the like of the radio receiver 1 by a user is schematically embodied by a user interface 9. A radio program broadcast on the FM band may be accompanied by radio data, such as radio data service (RDS) information. The same is generally not the case for radio programs sent in AM band, such as LW, MW and SW band. If the controller 2 senses based on audio quality signals provided by the tuners 3 and 4, that the quality of a radio program broadcast in FM band diminishes, it may decide to switch to the AM tuner 4 to decode the same radio program broadcast on a frequency in one of the AM bands. The necessary frequency concordance information is derived from radio data received from the radio program concerned in the FM band. The radio data can also be retrieved from an RD memory 10 which coupled to the RD decoder 7. Conversely, the controller 2 is arranged to sense that a switching from one of the AM bands to FM band is necessary in order to maintain a minimum desired audio quality of a radio program. When necessary, the appropriate RD information can be retrieved from the RD memory 10. This is because during a previous presence within the FM band area covered by the radio program concerned the relevant RD information is already stored in the memory 10. This information can thereafter be used to switch back from LW, MW and/or SW to the proper FM band frequency of the radio program.

Alternatively, the AM band tuner 4 may include an additional FM band tuner. The presence of such an additional FM band tuner eases the regular monitoring of the FM band for a FM frequency, whereupon the current radio program listened to on one of the AM bands, is also broadcast. The radio receiver 1 will switch back to FM band as soon as the audio quality on FM is sufficiently available again.

The radio receiver 1 can be provided with a cancellation switch 11 coupled to the controller 2 for cases wherein the actual radio program frequency is used or disturbed by another program. Activating the switch 11 will result in searching for another available frequency for receiving the same radio program.

The above has been described with reference to essentially preferred embodiments and best possible modes. It will be understood that these embodiments are by no means to be construed as limiting examples of the receiver embodiments concerned, because various modifications, features and combination of features falling within the scope of the appended claims are now within reach of the skilled person.

What is claimed is:

1. A radio receiver, comprising:

an FM band tuner;

an AM band tuner;

a controller coupled to both the FM band tuner and the AM band tuner; and a radio data decoder for providing radio data, where the radio data decoder is coupled for receiving radio data from at least one of the tuners which is tuned to a radio program, wherein the radio receiver comprises an radio data memory coupled to the radio data decoder, where the memory at least contains radio program frequency correspondence data, the radio receiver is designed to store radio program frequency correspondence data in the memory during presence in the FM band and to use the radio program frequency correspondence data later for switching back from the AM band, and the radio data decoder is coupled to the controller for automatically switching the radio receiver from the FM band to the AM band or vice versa based on the radio program frequency correspondence data included in the radio data, wherein a same radio program is broadcast on both the FM and AM bands.

2. The radio receiver according to claim 1, wherein the AM band tuner is at least one of an LW band and an MW band tuner.

3. The radio receiver according to claim 2, wherein the controller is arranged for switching from the FM band to the LW band, or the MW band and vice versa.

4. The radio receiver according to claim 1, wherein both the FM and AM tuners are capable of providing an audio quality signal for input to and qualification by the controller.

5. The radio receiver according to claim 1, wherein the radio receiver is provided with a cancellation switch coupled to the controller for cases wherein the actual radio program frequency is used or disturbed by another program.

6. A portable or car radio receiver provided with a radio receiver, the receiver comprising:

an FM band tuner;

an AM band tuner;

a controller coupled to both the FM band tuner and the AM band tuner; and a radio data decoder for providing radio data, the radio data decoder being coupled for receiving radio data from at least one of the tuners which is tuned to a radio program, wherein the radio receiver comprises an radio data memory coupled to the radio data decoder, which memory at least contains radio program frequency correspondence data, the radio receiver is designed to store radio program frequency correspondence data in the memory during presence in the FM band and to use the radio program frequency correspondence data later for switching back from the AM band, and the RD decoder is coupled to the controller for automatically switching the radio receiver from FM band to AM band or vice versa based on radio program frequency correspondence data included in the radio data, wherein a same radio program is broadcast on both the FM and AM bands.

* * * * *